United States Patent

Harrell

Patent Number: 5,810,229
Date of Patent: Sep. 22, 1998

[54] BICYCLE STANDING-PASSENGER CARRIER

[76] Inventor: Vernon Harrell, 3543 Ireland Dr., Hope Mills, N.C. 28348

[21] Appl. No.: 738,773

[22] Filed: Oct. 29, 1996

[51] Int. Cl.⁶ .............................. B62J 1/28; B62J 25/00; B62J 39/00
[52] U.S. Cl. ..................... 224/415; 224/448; 224/457; 280/202; 280/291
[58] Field of Search ................................ 224/415, 457, 224/448; 280/288.4, 291, 202, 304.5

[56] References Cited

U.S. PATENT DOCUMENTS

| | | | |
|---|---|---|---|
| 1,317,378 | 9/1919 | McEnroe | 280/202 |
| 1,717,056 | 6/1929 | Mesinger | 280/202 |
| 2,517,957 | 8/1950 | Anderson | 224/415 |
| 3,288,490 | 11/1966 | Jensen | 280/291 |
| 5,154,096 | 10/1992 | Geller et al. | 280/288.4 |

*Primary Examiner*—Linda J. Sholl

[57] ABSTRACT

The invention pertains to a device which is mounted over the rear wheel of a bicycle which allows for a second rider. The device is generally an inverted u-shape fork which straddles the rear wheel. Foot rests extend outwardly from the wheel and are covered with anti-slip sleeves. A handle over the rear wheel provides a place for the second rider to hold onto while the bike is in operation. The device is attached to the bicycle with u-bolt assemblies.

3 Claims, 5 Drawing Sheets

BICYCLE STANDING-PASSENGER CARRIER

BACKGROUND OF THE INVENTION

1. Field of the Invention

This invention pertains to bicycles. Specifically, it pertains to a device allowing a second rider to ride over the rear wheel in a standing position.

2. Description of The Prior Art And Objectives Of The Invention

Conventional bicycles are equipped with a single-rider seat to accommodate the operator in a sitting position. Other patents, such as U.S. Pat. No. 1,082,227 and 4,051,985 address the concept of providing for a passenger seat to accommodate a second rider in a sitting position.

However, neither the design of the conventional bicycle, nor the modifications thereto by the above patents offer or suggest the possibility of a second rider riding the bicycle in a standing position behind the operator.

Further, observation of young bicycle operators and riders discloses that it is not uncommon for two youths to ride a bicycle with the first youth operating the bicycle while positioned on the seat, and the second youth standing behind the operator, one leg on either side of the rear wheel. The second youth's feet are precariously perched on the thin, horizontal, slightly protruding rear wheel axle bolt, and his hands are gripping the unstable surface provided by the first youth's shoulders in order to not fall off during operation.

This precarious positioning of the second youth illustrated a void that could be filled by a device which allowed a second rider to mount a bicycle in a standing position behind the operator without the need to grasp the operator's shoulders.

It is therefore an objective of the invention to provide a device which allows a second rider to ride a bicycle in a standing position behind the operator.

It is a further objective of the present invention to provide a safer alternative to the present method of grasping the shoulders of the operator.

It is yet a further objective of the present invention to provide a device with foot rests sized so as to provide a stable platform for a second rider.

It is still a further objective of the present invention to provide a device that is simple to attach and remove from a conventional bicycle frame.

It is another objective to provide a device which can be attached and removed with the use of a single tool.

It is yet another objective to provide a device which does not mar the surface of the bicycle frame at any point while attached to the bicycle frame.

Further objectives and advantages will become apparent from a consideration of the drawings and the ensuing description.

SUMMARY OF THE INVENTION

This invention pertains to a tubular inverted u-shape device which is easily attached and removed from a bicycle so that a second rider may ride the bicycle in a standing position behind the operator of the bicycle. Specifically, the tubular member is bent into an inverted u-shape and straddles the rear wheel of the bicycle. This u-shape provides a handle which the rider may grasp. U bolt assemblies attach the device to the bicycle frame at four locations, two on each side of the rear wheel. The ends of the device are bent outwardly so as to provide stable foot rests for the standing rider. Anti-slip sleeves and a grip pad are provided on the device so as to insure that the second rider is easily able to remain mounted on the bicycle during operation. Also, protective sleeves are provided proximate the U bolts so as to prevent the bolts and device from marring the paint on the bicycle. End caps plug the tubular member. The rider stands on the foot rests and grasps the handle during operation.

DETAILED DESCRIPTION OF THE PREFERRED EMBODIMENT AND OPERATION OF THE INVENTION

Figure 1:
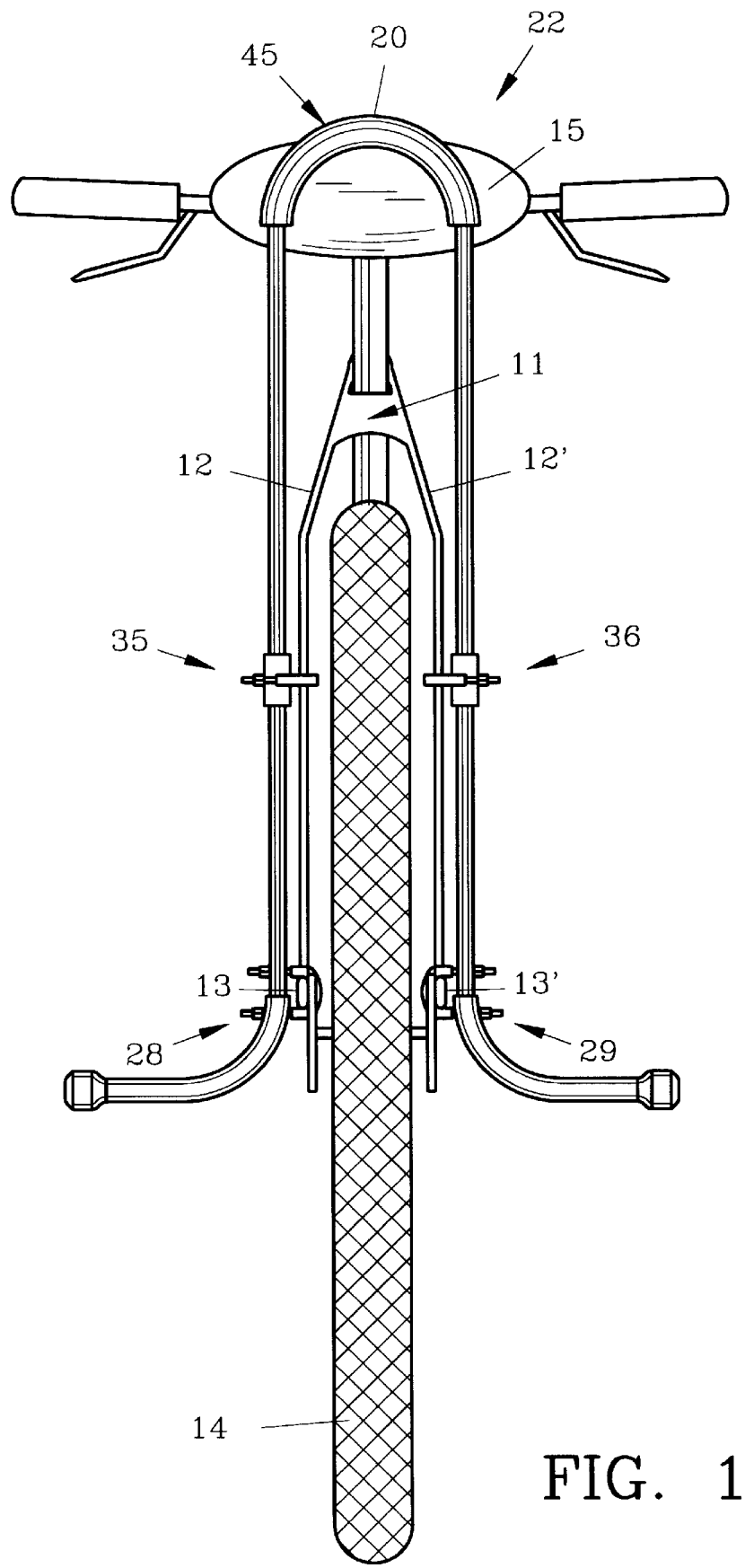
FIG. 1 shows a rear view of a bicycle with the device of the present invention mounted thereon.

Turning now to the drawings, specifically FIG. 1 shows a rear view of carrier 22 attached to bicycle 11 by upper left and right U bolt assemblies 35 and 36 respectively and lower left and right U bolt assemblies 28 and 29 respectively. Upper U bolt assemblies 35 and 36 attach to upper bicycle frame bars 12 and 12' respectively. Lower U bolt assemblies 28 and 29 attach to lower bicycle frame bars 13 and 13' respectively. Carrier 22 sits over tire 14 behind seat 15. Handle 45 is spaced from rear tire 14 sufficiently to allow a rider to fit human hands through the space between rear tire 14 and handle 45. Handle 45 includes grip pad 20 which serves to increase the frictional engagement between a rider's hands and handle 45.

Figure 2:
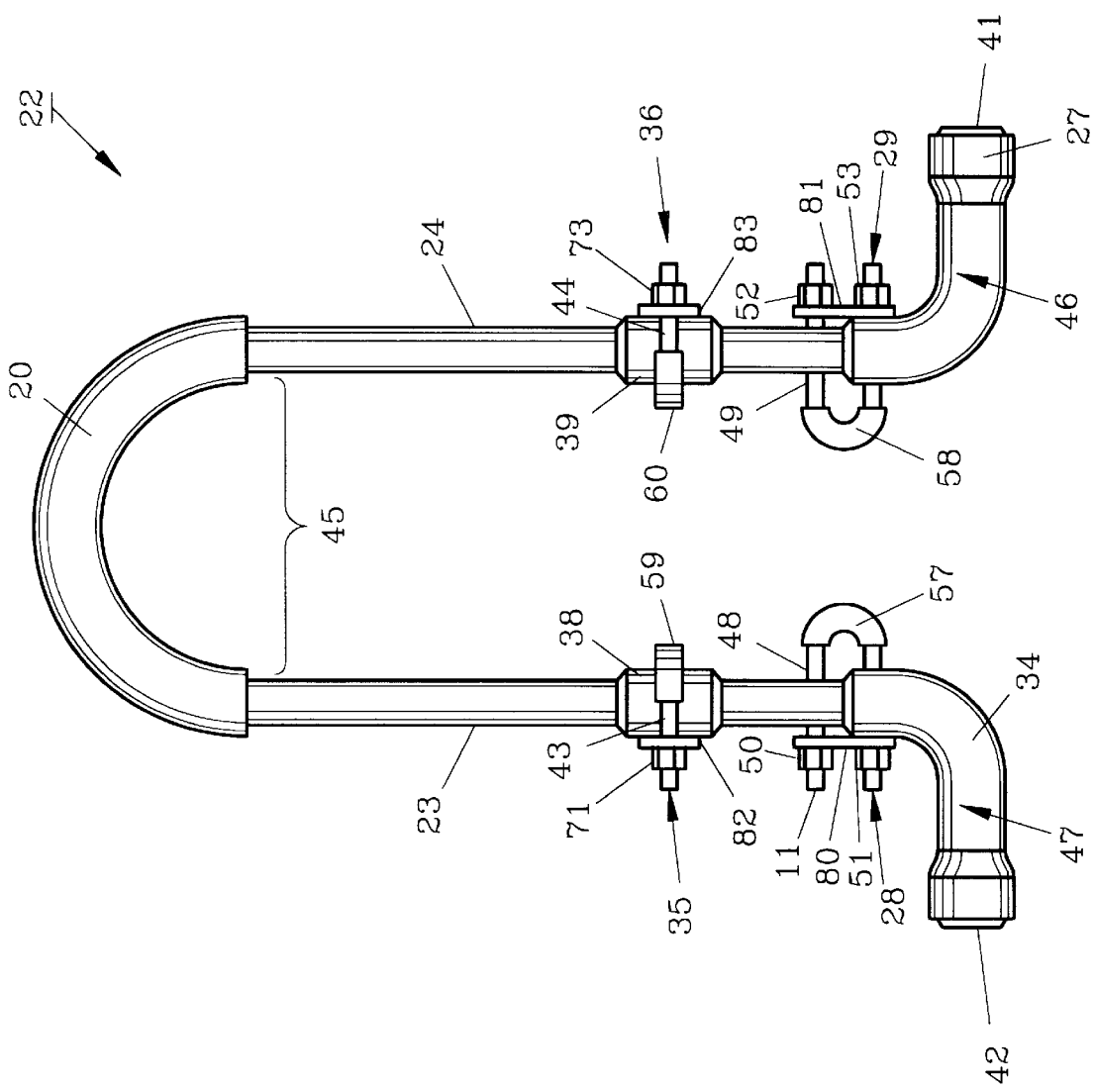
FIG. 2 illustrates a front view of the device of the present invention removed from the bicycle of FIG. 1.

In FIG. 2, carrier 22 is shown removed from bicycle 11 and thus, u-bolt assemblies 28, 29, 35 and 36 are illustrated in greater detail. Carrier 22 is a tubular member which has been bent into a generally inverted u-shape handle as generally indicated by 45. Downwardly depending left and right legs 23 and 24 respectively help form said u-shape. Outwardly extending right and left foot rests 46 and 47 respectively are integrally formed with depending legs 24 and 23 respectively and are bent at approximately 90 degrees from the vertical legs 23 and 24.

Upper u bolt assemblies 35 and 36 are substantially identical, and comprise u-shaped members 43 and 44 respectively which fit around depending legs 23 and 24 respectively in a generally horizontal manner. Protective sleeves 38 and 39 prevent u shaped members 43 and 44 from marring the finish on carrier 22 or on bicycle 11. Protective sleeves 38 and 39 are freely slidable up and down the length of legs 23 and 24. U-shaped members 43 and 44 are also sized to fit around upper bicycle frame members 12 and 12' as seen in FIGS. 1 and 5. Protective sleeves 59 and 60 fit over u-shaped members 43 and 44 respectively to protect the paint finish on bicycle 11. Elongated washers 82 and 83 fit over both ends of u-shaped members 43 and 44 respectively and are held in place by nuts 70, 71, 72 and 73, as better seen in FIGS. 3 and 4.

Lower U bolt assemblies 28 and 29 are also substantially identical, and comprise u-shaped members 48 and 49 respectively in a generally vertical manner. Protective sleeves 57 and 58 cover u-shaped member 48 and 49 respectively in much the same manner as protective sleeves 59 and 60. Elongated washers 80 and 81 fit over both ends of u-shaped members 48 and 49 respectively and are secured in place by nuts 50, 51, 52 and 53. It should be understood that u-shaped members 48 and 49 extend through depending legs 23 and 24 as will be explained in greater detail below.

Right foot rest 46 and left foot rest 47 are covered by anti-slip sleeves 27 and 34 respectively. The ends of outwardly extending foot rests 46 and 47 are capped by end caps 41 and 42 respectively and form a seal so that moisture will not enter carrier 22.

Figure 3:
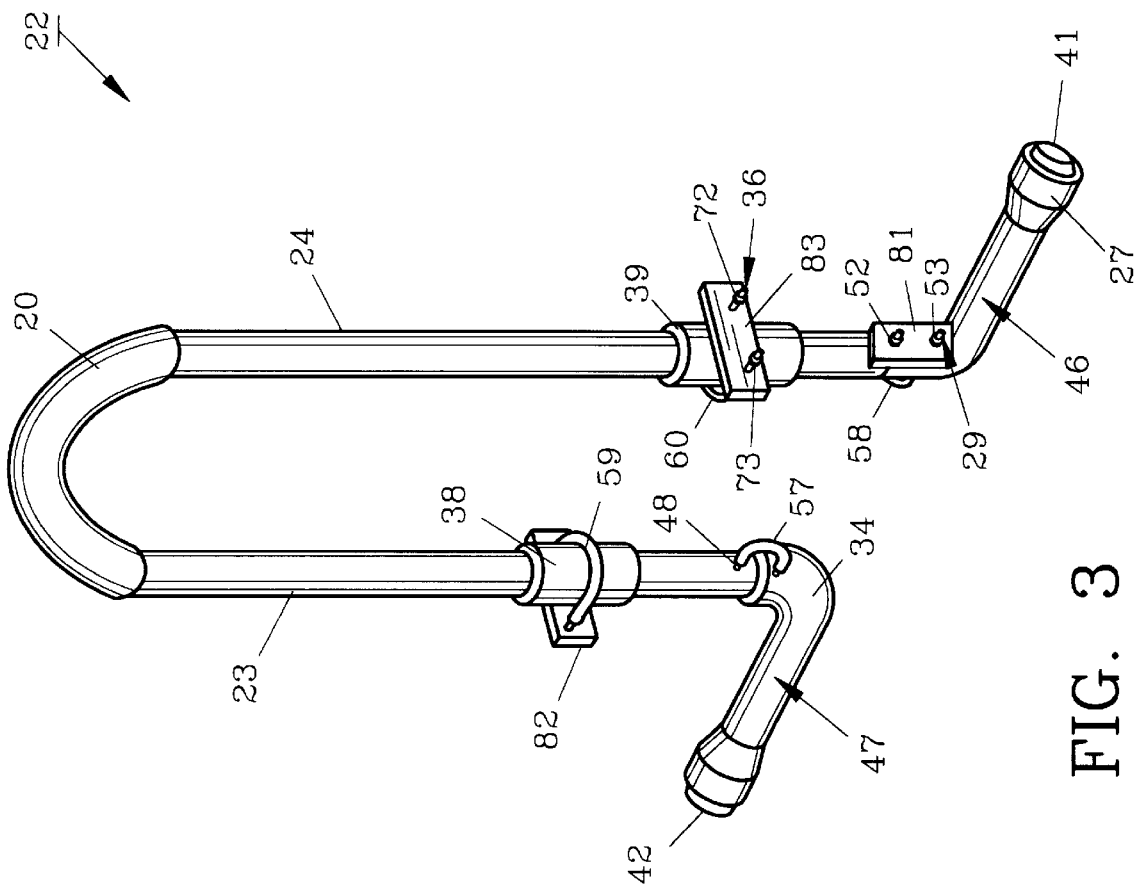
FIG. 3 demonstrates a perspective view of the device of FIG. 2.

FIG. 3 features a perspective view of carrier 22 and allows better understanding of nuts 52, 53, 72 and 73 arrangement relative to washers 81 and 83.

Figure 4:
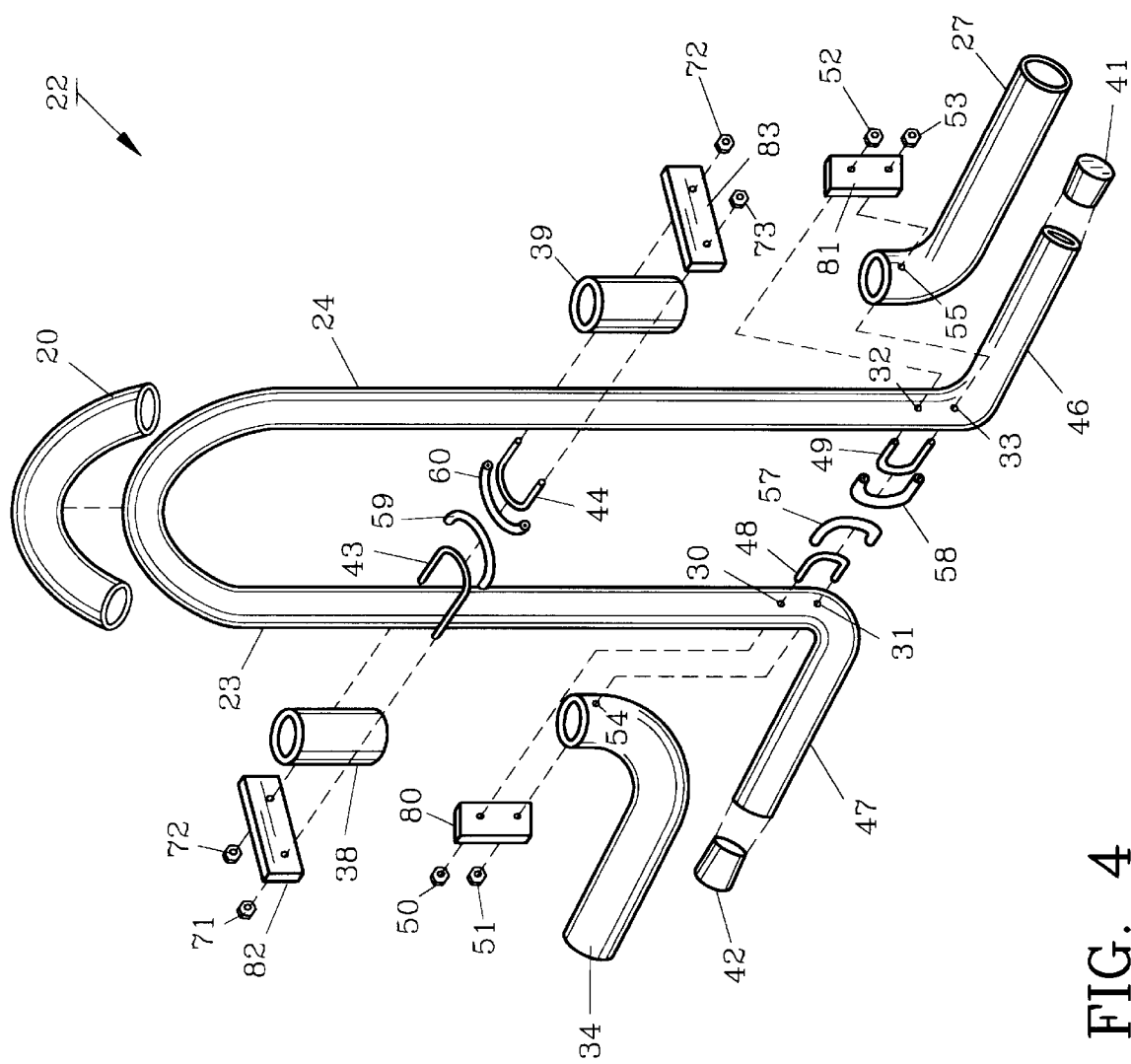
FIG. 4 features an exploded view of the device of FIG. 3.
Figure 5:
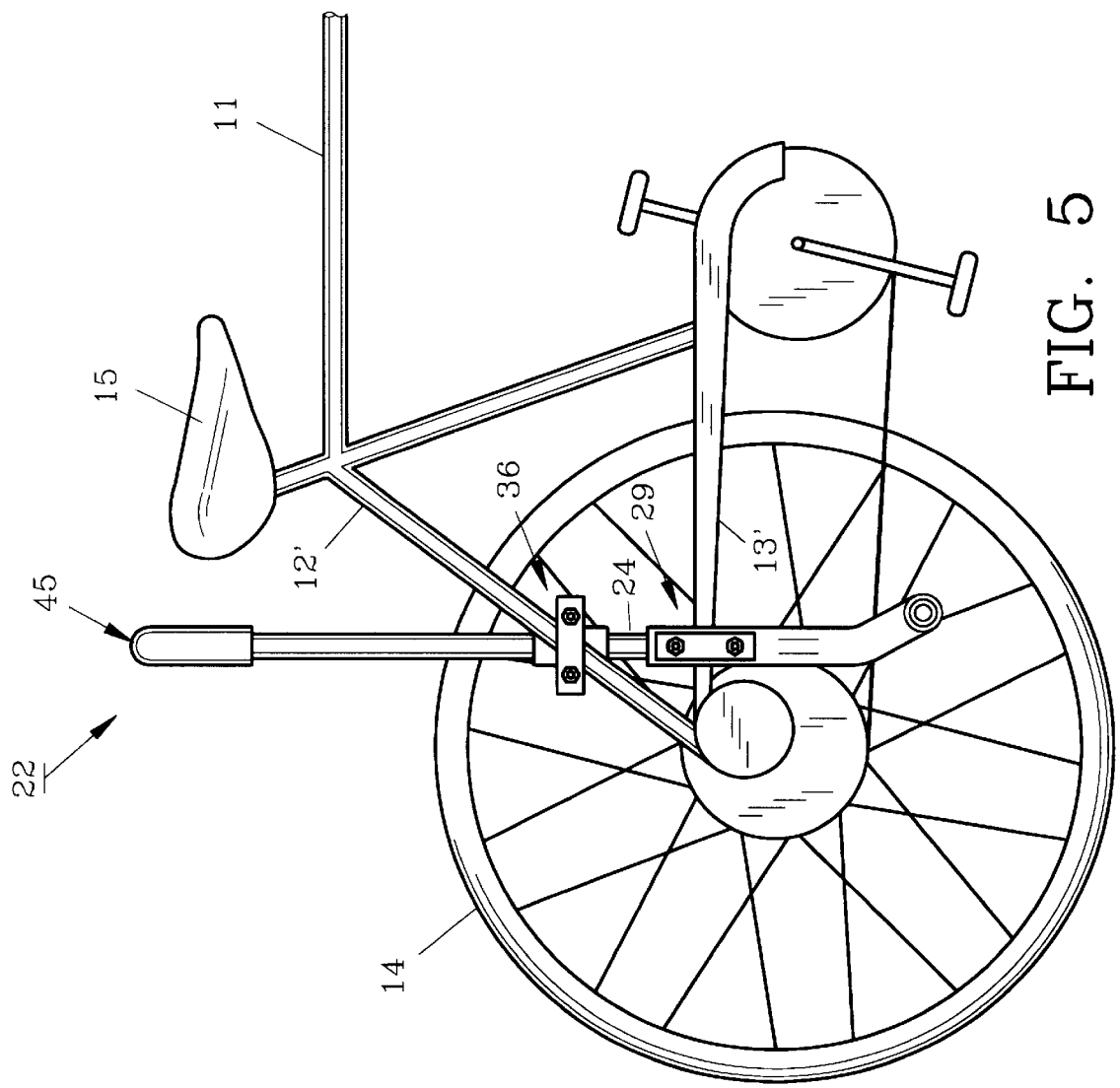
FIG. 5 pictures a partial side view of the device mounted on a bicycle.

The exploded view of FIG. 4 illustrates apertures 30–33 defined by depending legs 23 and 24. Apertures 30–33 receive u-shaped members 48 and 49. U-shaped members 48 and 49 extend all the way through depending legs 23 and 24 by passing the threaded ends of u-shaped members through apertures 30–33 as seen in FIGS. 2–4. Right anti-slip sleeve 27 defines two apertures 55 (only one shown) which are axially aligned to allow one end of u-shaped member 49 to pass therethrough in order to hold anti-slip sleeve 27 in its desired position on right foot 46. Likewise, left anti-slip sleeve 34 defines two apertures 54 (only one shown) which are axially aligned to allow one end of u-shaped member 48 to pass therethrough in order to hold anti-slip sleeve 34 in its desired position on left foot 47.

Turning finally to FIG. 5 which shows how u-bolt assemblies 36 and 29 engage frame member 12 and 13 of bicycle 11. U-shaped members 44 and 49 pass around frame members 12' and 13' before passing around or going through depending leg 24 and being secured in place by nuts 52, 53, 72, and 73. Handle 45 is located behind seat 15 at approximately the same height or slightly higher. Handle 45 is spaced from tire 14 so that there is no danger of touching tire 14 when grasping handle 45 even when there is no rear bumper provided on bicycle 11.

Carrier 22 is easy to attach and remove from bicycle 11. U bolt assemblies 28, 29, 35 and 36 are disengaged and removed from carrier 22. Then the user positions carrier 22 astride rear tire 14 so that depending legs 23 and 24 are on either side of tire 14 and spaced one from the other. It should be understood that depending legs 23 and 24 are exterior of frame members 12, 12', 13 and 13'. Apertures 30 and 32 are positioned above frame members 13 and 13' and apertures 31 and 33 are positioned below frame members 13 and 13'. The user selects a side to start on, e.g. the right side, and slips the appropriate u-shaped member 49 around frame member 13' and through apertures 32, 33, and 55. Elongated washer 81 is positioned over u-shaped member 49 and nuts 52 and 53 are loosely threaded onto u-shaped member 49. This process is repeated on the left side using the appropriate pieces. Then, again assuming that the user starts with the right side, u-shaped member 44 is placed around upper frame member 12' and depending leg 24. Elongated washer 83 is put over u-shaped member 44 and nuts 72 and 73 are loosely threaded onto u-shaped member 44. Protective sleeve 39 is slid into a position where it will protect upper frame member 12' from frictional engagement with depending leg 24 and nuts 72 and 73 are tightened. The process is repeated on the left side using the appropriate parts. Then lower nuts 50–53 are then tightened as needed.

The preceding recitation is provided as an example of the preferred embodiment and is not meant to limit the nature or scope of the present invention or the appended claims.

I claim:

1. A passenger carrier for transporting a passenger on the back of a bicycle, said carrier comprising:
   a) an inverted u-shaped handle;
   b) two legs, said legs each depending linearly, vertically downward from said handle;
   c) two foot rests, each of said foot rests attached to different ones of said legs, each of said foot rest extending outwardly from the leg to which said foot rest is attached;
   d) two anti-slip sleeves, each of said anti-slip sleeves surrounding different ones of said foot rests;
   e) four U bolt assemblies, said U bolt assemblies each contiguous to said legs;
   f) a pair of protective sleeves, each of said protective sleeves surrounding different ones of said legs, said protective sleeves freely slidable on said legs.

2. The carrier of claim 1 further comprising a grip pad, said grip pad surrounding said handle.

3. The carrier of claim 1 wherein each of said U bolt assemblies comprises a u-shaped member, two nuts, an elongated washer and a u-shaped protective sleeve, said u-shaped protective sleeve surrounding said u-shaped member, said nuts threaded onto the ends of said u-shaped member sandwiching said elongated washer onto said u-shaped member.

* * * * *